United States Patent
Jung et al.

(10) Patent No.: US 9,025,013 B2
(45) Date of Patent: May 5, 2015

(54) STEREOSCOPIC DISPLAY APPARATUS FOR DISPLAYING AN IMAGE WITH REDUCED CROSSTALK AND METHOD OF DRIVING THE SAME

(75) Inventors: Jong-hoon Jung, Suwon-si (KR); Dae-sik Kim, Hwaseong-si (KR); Kyung-hoon Cha, Yongin-si (KR); Ho-seop Lee, Seongnam-si (KR); Young-ji Ko, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 484 days.

(21) Appl. No.: 13/097,980

(22) Filed: Apr. 29, 2011

(65) Prior Publication Data

US 2011/0267341 A1 Nov. 3, 2011

Related U.S. Application Data

(60) Provisional application No. 61/349,931, filed on May 31, 2010, provisional application No. 61/282,967, filed on Apr. 30, 2010.

(30) Foreign Application Priority Data

Nov. 5, 2010 (KR) .................. 10-2010-0109780

(51) Int. Cl.
 *H04N 13/04* (2006.01)
 *H04N 9/47* (2006.01)
 *G02B 27/22* (2006.01)
 *H04N 5/359* (2011.01)
 *G09G 3/00* (2006.01)
 *G09G 3/20* (2006.01)
 *G09G 3/34* (2006.01)

(52) U.S. Cl.
 CPC ........ *H04N 13/0438* (2013.01); *G02B 27/2264* (2013.01); *G09G 2320/0209* (2013.01); *H04N 13/044* (2013.01); *H04N 13/0497* (2013.01); *H04N 5/359* (2013.01); *G09G 3/003* (2013.01); *G09G 3/20* (2013.01); *G09G 3/342* (2013.01); *G09G 2310/024* (2013.01)

(58) Field of Classification Search
 CPC .................. G02B 27/2264; G09G 2320/0209; H04N 13/0438; H04N 13/044; H04N 13/0497; H04N 5/359
 See application file for complete search history.

(56) References Cited

U.S. PATENT DOCUMENTS

| | | | |
|---|---|---|---|
| 2007/0229478 A1 | 10/2007 | Rosenberg et al. | |
| 2008/0007514 A1* | 1/2008 | Tanaka | 345/102 |
| 2010/0066820 A1* | 3/2010 | Park et al. | 348/53 |
| 2011/0018983 A1* | 1/2011 | Kim et al. | 348/56 |

OTHER PUBLICATIONS

Ishii et al. WO2010064557 A1 English Translation.*

* cited by examiner

*Primary Examiner* — Joseph Ustaris
*Assistant Examiner* — Jill Sechser
(74) *Attorney, Agent, or Firm* — Sughrue Mion, PLLC (57) ABSTRACT

A stereoscopic display apparatus includes a display panel which scans an image at a frame frequency that is an odd-numbered multiple of a field frequency, an image signal input unit which inputs an image signal to the display panel, a backlight unit which emits light to the display panel, and a shutter controller which controls an opening and a closing of a left eye shutter and a right eye shutter of shutter glasses.

29 Claims, 7 Drawing Sheets

STEREOSCOPIC DISPLAY APPARATUS FOR DISPLAYING AN IMAGE WITH REDUCED CROSSTALK AND METHOD OF DRIVING THE SAME

CROSS-REFERENCE TO RELATED PATENT APPLICATIONS

This application claims the benefit of provisional application Ser. No. 61/282,967 filed Apr. 30, 2010 and a provisional application Ser. No. 61/349,931 filed May 31, 2010, which are incorporated herein in their entirety by reference.

This application claims priority from Korean Patent Application No. 10-2010-0109780, filed on Nov. 5, 2010, in the Korean Intellectual Property Office, the disclosure of which is incorporated herein in its entirety by reference.

BACKGROUND

1. Field

The following description relates to a stereoscopic display apparatus and a method of driving a stereoscopic display apparatus.

2. Description of the Related Art

In general, a three dimensional (3-D) image is perceived due to the stereoscopic vision enabled by seeing an image through two separate eyes. Binocular parallax, which is generated because a person's left and right eyes are separated about 65 mm, may be regarded as the most important factor in creating a stereoscopic effect. A stereoscopic effect is achieved when the left and right eyes see two, slightly different images. Thus, for the purpose of generating a 3D image, a scene or object is photographed using two cameras of the same type that are separated from each other at the same distance as the average distance between a person's left and right eyes. Then, an image photographed by a left camera is provided only to the left eye and an image photographed by a right camera is provided only to the right eye.

A stereoscopic display apparatus may be a glasses type display or a non-glasses type display. A glasses type display may be a polarized glasses type display or a shutter glasses type display. A non-glasses type display may be a parallax barrier type display, a lenticular type display, an integral imaging type display, or a holography type display.

A shutter glasses type display produces a stereoscopic image by using liquid crystal shutter glasses. A liquid crystal shutter glasses type display provides different images to the left eye and the right eye at a frequency of, for example, 120 Hz. A stereoscopic display apparatus using a liquid crystal shutter glasses type alternately displays a left image and a right image and controls the alternate opening and closing of a left liquid crystal shutter and a right liquid crystal shutter in synchronization with displaying of the left eye image and the right eye image.

However, in a glasses type 3-D display, a crosstalk phenomenon may occur in which a left eye image and a right eye image are mixed in one frame. The crosstalk phenomenon can thus cause incorrect images to be displayed to the left and right eyes of a viewer causing fatigue and or the perception of blurred images.

SUMMARY

One or more embodiments provide a stereoscopic display apparatus for displaying an image in which crosstalk is reduced or removed, and a method of driving the stereoscopic display apparatus.

According to an aspect of an embodiment, there is provided a stereoscopic display apparatus including a display panel which scans an image at a frame frequency that is an odd-numbered multiple of a field frequency, an image signal input unit which inputs an image signal to the display panel, a backlight unit which emits light to the display panel, and a shutter controller which selectively controls an opening and a closing of a left eye shutter and a right eye shutter of shutter glasses.

The display panel may scan a field including a first frame including a left eye image, one half of a second frame including a half left eye image, another half of a second frame including a half right eye image, and a third frame including a right eye image.

The backlight unit may be turned on in a period in which the half left eye image is scanned and in a period in which a latter half of the right eye image signal is scanned.

The backlight unit may blink once per 1.5 frames.

The backlight unit may comprise a plurality of blocks, where each of the plurality of blocks is individually turned on and off.

The shutter controller may control to open the left eye shutter and close the right eye shutter in a period in which the half left eye image is scanned, and may control to close the left eye shutter and open a right eye shutter in a period in which a latter half of the right eye image is scanned.

The display panel may scan a field including a first frame including a left eye image, a first half frame in which the left eye image is held for a period of half a frame, a second frame including a right eye image, and a second half frame in which the right eye image is held for a period of half a frame.

The backlight unit may be turned on in a period in which the first half frame is scanned and in a period in which the second half frame is scanned.

The backlight unit may comprise a plurality of blocks, wherein each of the plurality of blocks is individually turned on and off.

The shutter controller may control to open the left eye shutter and close the right eye shutter in a period in which the first half frame is scanned, and may control to close the left eye shutter and open the right eye shutter in a period in which the second half frame is scanned.

The field frequency may be 50 Hz or 60 Hz.

The frame frequency may be 150 Hz or 180 Hz.

The display panel may scan a field including 1.5 frames of the left eye image and 1.5 frames of the right eye image.

The image signal input unit may include a time controller that transmits the image signal to the display panel.

The image signal input unit may modulate a vertical sync signal in an image board and transmit a modulated vertical sync signal to a time controller.

According to an aspect of another embodiment, a method of driving a stereoscopic display apparatus is provided, including inputting an image signal to a display panel, scanning an image signal at a frame frequency that is an odd-numbered multiple of a field frequency, using a display panel, emitting light to the display panel, using a backlight unit, and selectively opening and closing a left eye shutter and a right eye shutter of shutter glasses, using a shutter controller.

BRIEF DESCRIPTION OF THE DRAWINGS

The above and/or other aspects and advantages will become more apparent from the following description of embodiments with reference to the attached drawings in which.

DETAILED DESCRIPTION

The attached drawings for illustrating embodiments are referred to in order to gain a sufficient understanding of the present description, the merits thereof, and the objectives accomplished by the implementation of embodiments. Like reference numerals in the drawings denote like elements.

Figure 1:
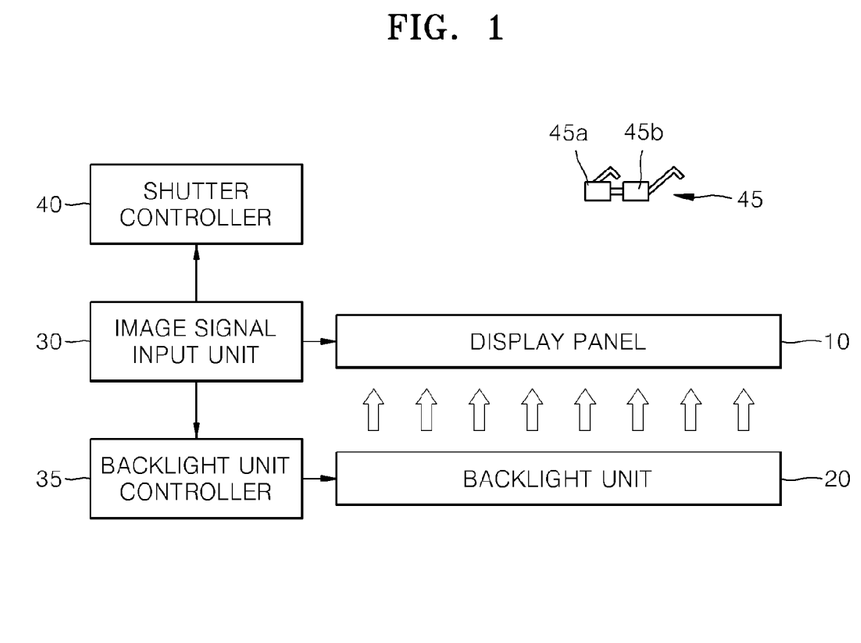
FIG. 1 is a block diagram schematically illustrating a stereoscopic display apparatus according to an embodiment.

FIG. 1 is a block diagram schematically illustrating a stereoscopic display apparatus according to an embodiment. Referring to FIG. 1, the stereoscopic display apparatus according to the present embodiment may include a display panel 10 for displaying an image, a backlight unit 20 for emitting light to the display panel 10, and an image signal input unit 30 for inputting an image signal to the display panel 10.

The stereoscopic display apparatus may be a liquid crystal display (LCD), a plasma display panel (PDP), or an organic light emitting diode (OLED). The display panel 10 may include, for example, a liquid crystal panel. The liquid crystal panel may include a plurality of pixels, each pixel including a thin film transistor and an electrode. An image may be displayed by a method of modulating light emitted from the backlight unit 20 by applying an electric field to liquid crystal in units of pixels according to an image signal input by the image signal input unit 30.

The backlight unit 20 may include a light source such as a cold cathode fluorescent light (CCFL) or a light emitting diode (LED). A backlight unit controller 35 may control the backlight unit 20. The backlight unit 20 may be a direct type backlight or an edge type backlight. The image signal input unit 30 may include a two dimensional (2-D) image signal or a 3-D image signal.

In the stereoscopic display apparatus according to the present embodiment, a 3-D image may be viewed using shutter glasses 45. The image signal input unit 30 alternately inputs a left eye image signal and a right eye image signal to the display panel 10. A shutter controller 40 opens a left eye shutter 45a of the shutter glasses 45 and closes a right eye shutter 45b of the shutter glasses 45 in synchronization with the left eye image signal. Also, the shutter controller 40 closes the left eye shutter 45a of the shutter glasses 45 and opens the right eye shutter 45b of the shutter glasses 45 in synchronization with the right eye image signal. Thus, a 3-D image may be displayed. The shutter glasses 45 may be controlled via wire or wirelessly. The shutter controller 40 may control the opening/and closing of the left eye shutter 45a and the right eye shutter 45b by selecting a period with respect to the right eye image signal and the left eye image signal. When the image signal input unit 30 inputs a 2-D image signal to the display panel 10, a 2-D image may be viewed without the shutter glasses 45.

Figure 2:
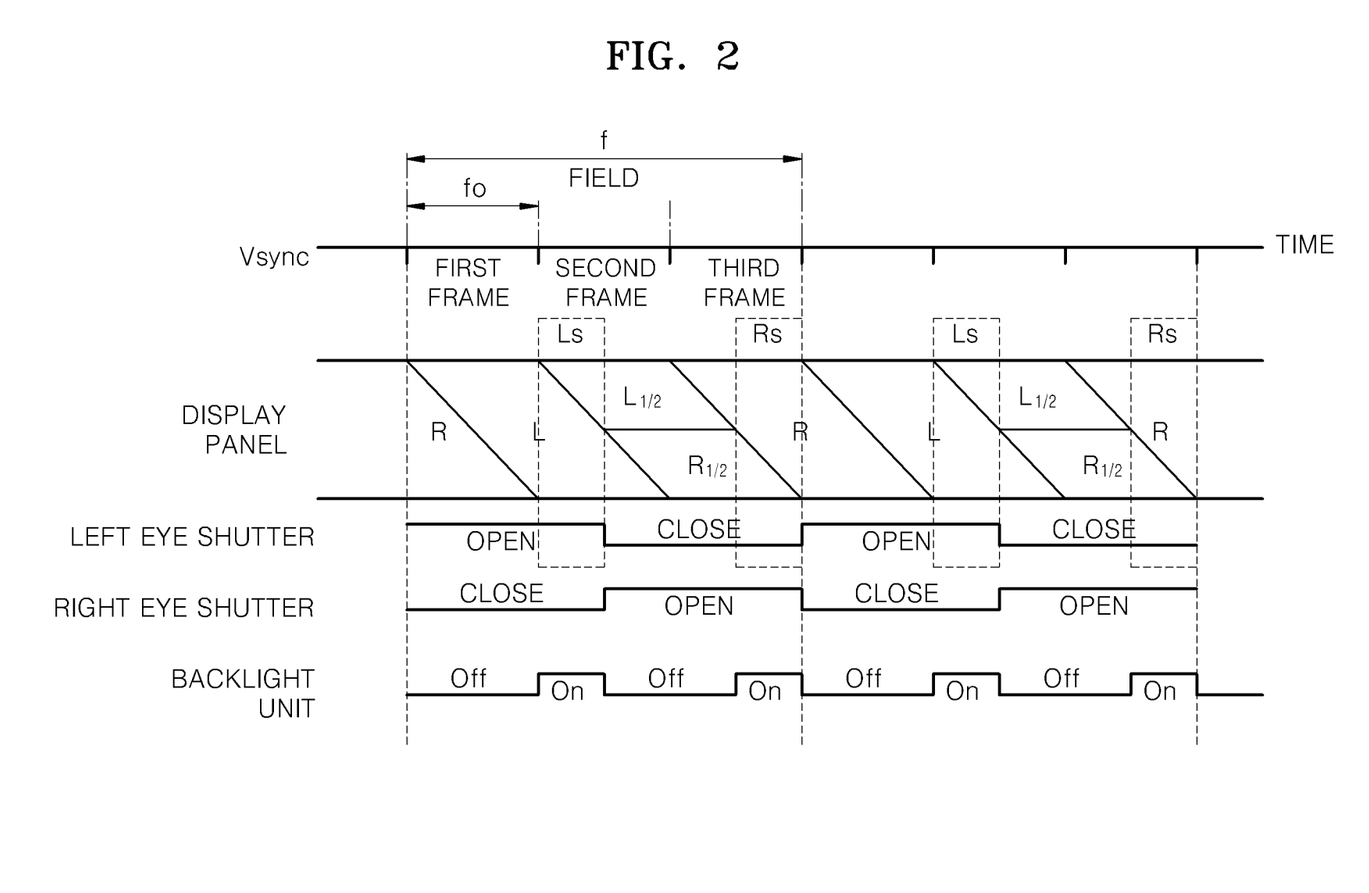
FIG. 2 illustrates a method of driving a stereoscopic display apparatus according to an embodiment.

FIG. 2 illustrates a method of driving a stereoscopic display apparatus according to an embodiment. Referring to FIG. 2, the display panel 10 may be driven at a predetermined frame frequency $f_0$. The frame frequency $f_0$ indicates the number of frames per second, which may indicate a speed of scanning an image signal of one frame in the display panel 10. A cyclic period presenting one scene by adding a left eye image and a right eye image is referred to as a field. The number of fields per second may be indicated by a field frequency f. In the stereoscopic display apparatus according to the present embodiment, the frame frequency may be an odd-numbered multiple of the field frequency f. For example, when the display panel 10 has a field frequency of 60 Hz, the frame frequency may be 180 Hz, 300 Hz, or 420 Hz. Also, when the display panel 10 has a field frequency of 50 Hz, the frame frequency may be 150 Hz, 250 Hz, or 350 Hz. The field frequency f and the frame frequency $f_0$ are not limited thereto and a variety of modifications may be available.

Referring to FIG. 2, the image signal input unit 30 may input to the display panel 10, for example, a left eye image signal L, a half left eye image signal $L_{1/2}$, a half right eye image signal $R_{1/2}$, and a right eye image signal R. In FIG. 2, one field includes, for example, a first frame, a second frame, and a third frame. The first frame may include the left eye image L, the second frame may include the half left eye image signal $L_{1/2}$ and the half right eye image signal $R_{1/2}$, and the third frame may include the right eye image R. In the present specification, the same reference letters R and L are used for both an image and for an image signal. The half left eye image signal $L_{1/2}$ may be input to one half of the second frame, whereas the half right eye image signal $R_{1/2}$ may be input to the other half of the second frame. The half left eye image signal $L_{1/2}$ may be an upper half image of the left eye image, whereas the half right eye image signal $R_{1/2}$ may be a lower half image of the right eye image.

The image signals may be input to the display panel 10 in synchronization with a vertical sync signal Vsync. When the display panel 10 has a field frequency of 60 Hz, each frame of the display panel 10 may be driven at a frame frequency of 180 Hz.

The backlight unit 20 may be turned on in a period Ls for scanning the half left eye image signal $L_{1/2}$, turned on in a period Rs for scanning the latter half of the right eye image R, and turned off in the other periods. As such, the backlight unit 20 may be turned on once for each 1.5 frames. The left eye shutter 45a of the shutter glass 45 may be open and simultaneously the right eye shutter 45b of the shutter glass 45 may be closed, in the periods during which the left eye image L and the half left eye image $L_{1/2}$ are scanned. The left eye shutter 45a of the shutter glass 45 may be closed and simultaneously the right eye shutter 45b of the shutter glass 45 may be open, in the periods during which the half right eye image $R_{1/2}$ and the right eye image R are scanned.

The left eye shutter 45a may be open only in the period Ls during which the half left eye image $L_{1/2}$ is scanned and closed in the other periods. In contrast, the right eye shutter 45b may be open only in the period Rs during which the latter half of the right eye image R is scanned and closed in the other periods. In this case, the backlight unit 20 may be continuously turned on without blinking, or may be turned on in the period Ls during which the half left eye image $L_{1/2}$ is scanned, turned on in the period Rs during which the latter half of the right eye image R is scanned, and closed in the other periods.

An image in the period Ls during which the half left eye image $L_{1/2}$ is scanned and an image in the period Rs during which the latter half of the right eye image R is displayed may be selectively displayed by a combination of the opening and closing operations of the left eye shutter 45a and the right eye shutter 45b and the turning on and off operations of the backlight unit 20. Only a left eye image may be displayed in the period Ls during which the half left eye image $L_{1/2}$ is scanned, and only a right eye image may be displayed in the period Rs in which the latter half of the right eye image R is scanned. Accordingly, due to the combination of the opening and closing operations of the left eye shutter 45a and the right eye shutter 45b and the turning on and off operations of the backlight unit 20, no image is displayed in a period in which the left eye image and the right eye image are mixed with each other. Thus, the left eye image and the right eye image may be displayed without crosstalk.

In the stereoscopic display apparatus according to the present embodiment, when a cycle in which one scene is displayed is considered to be a field, one field may include an odd-number of frames in which an even-numbered frame includes a half left eye image and a half right eye image. In the period Ls in which the half left eye image $L_{1/2}$ is scanned, the left eye shutter 45a is open, the right eye shutter 45b is closed, and the backlight unit 20 is turned on, such that the left eye image is displayed. In the period Rs during which the latter half of the right eye image R is scanned, the left eye shutter 45a is closed, the right eye shutter 45b is open, and the backlight unit 20 is turned on, such that the right eye image is displayed.

Figure 3:
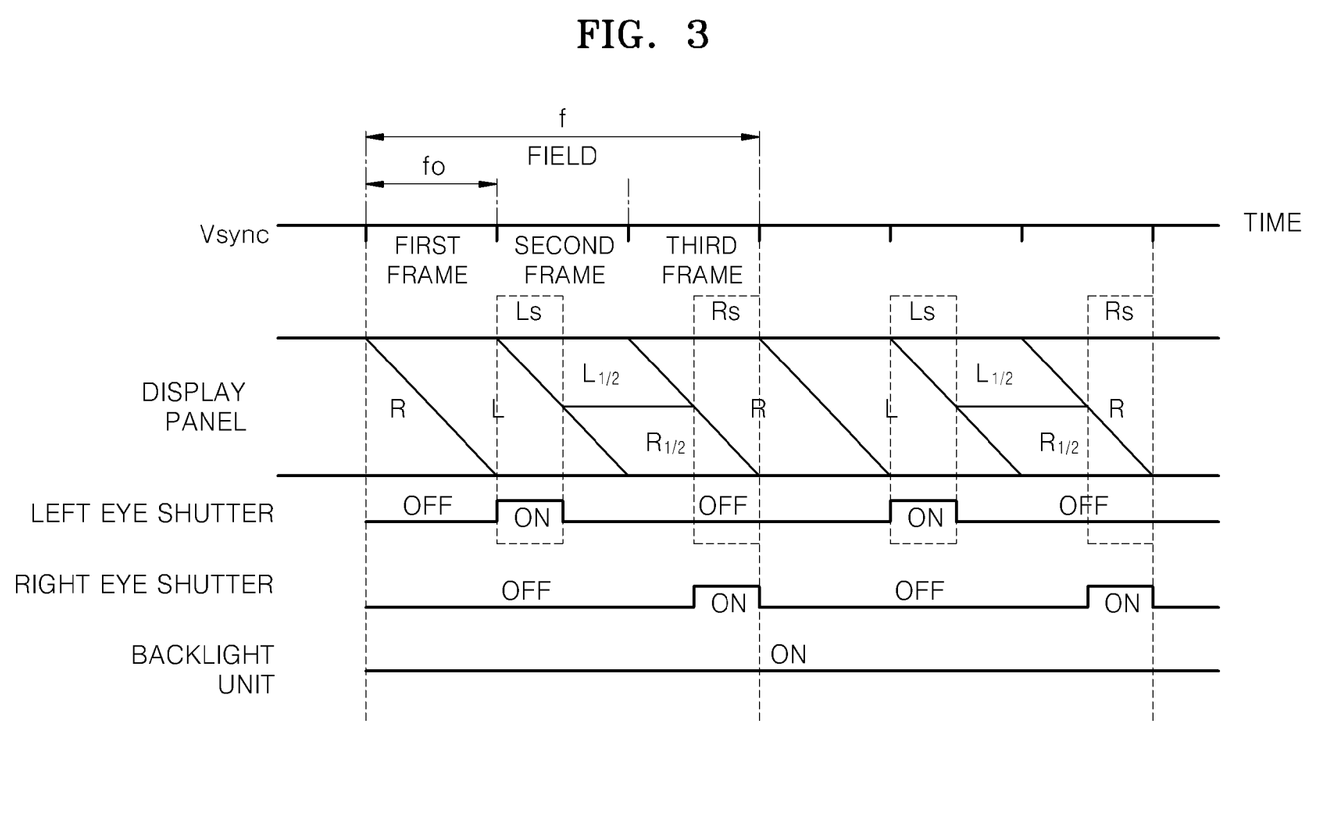
FIG. 3 illustrates a method of driving a stereoscopic display apparatus according to another embodiment.

In FIG. 3, the backlight unit 20 is turned on in all periods, and a left eye image and a right eye image are displayed in the period Ls in which the half left eye image $L_{1/2}$ is scanned and the period Rs in which the latter half of the right eye image R is scanned by the opening and closing operations of the left eye shutter 45a and the right eye shutter 45b.

Figure 4:
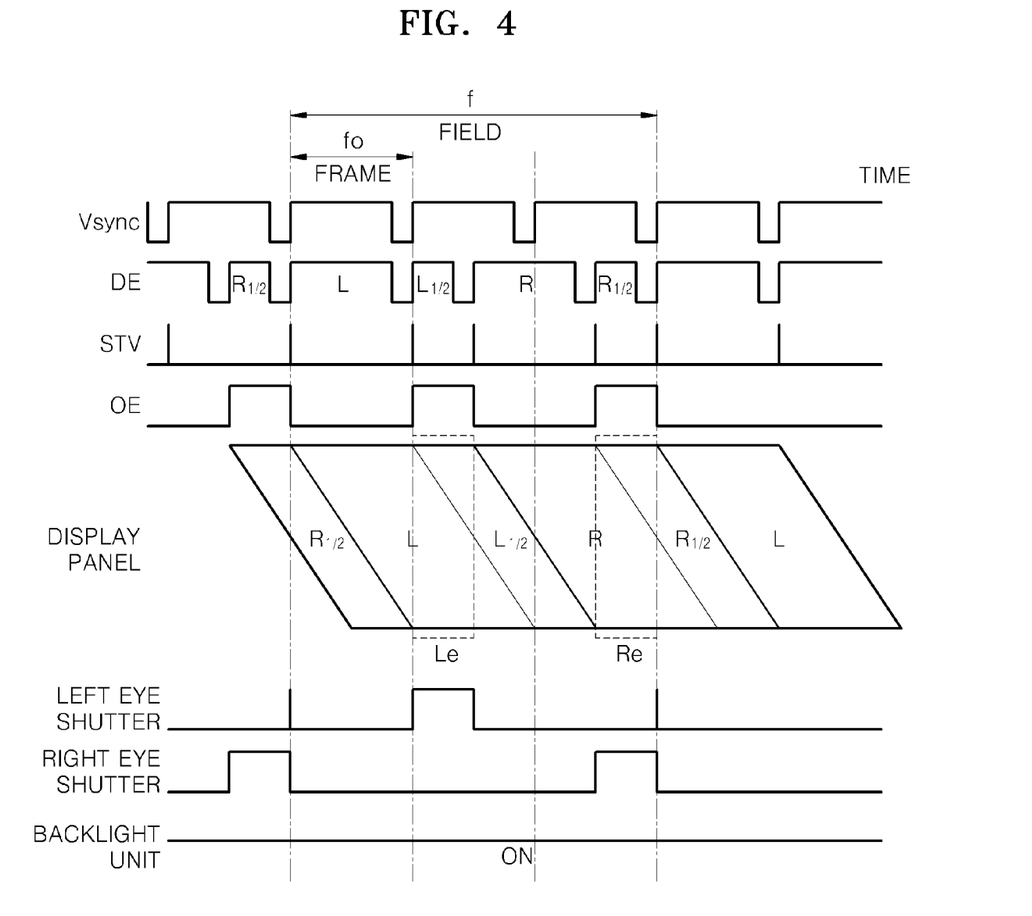
FIG. 4 illustrates a method of driving a stereoscopic display apparatus according to another embodiment.

FIG. 4 illustrates a method of driving a stereoscopic display apparatus according to another embodiment. In the present embodiment, the display panel 10 may be operated at a frame frequency $f_0$ that is an odd-numbered multiple of the field frequency f. For example, the display panel 10 may include a first frame, a first half frame, a second frame, and a second half frame. The first frame may include the left eye image L. The first half frame may include the half left eye image $L_{1/2}$ that is displayed by holding the left eye image during a first half frame period Le. The second frame may include the right eye image R. The second half frame may include the half right eye image $R_{1/2}$ that is displayed by holding the right eye image during a second half frame period Re.

Figure 5:
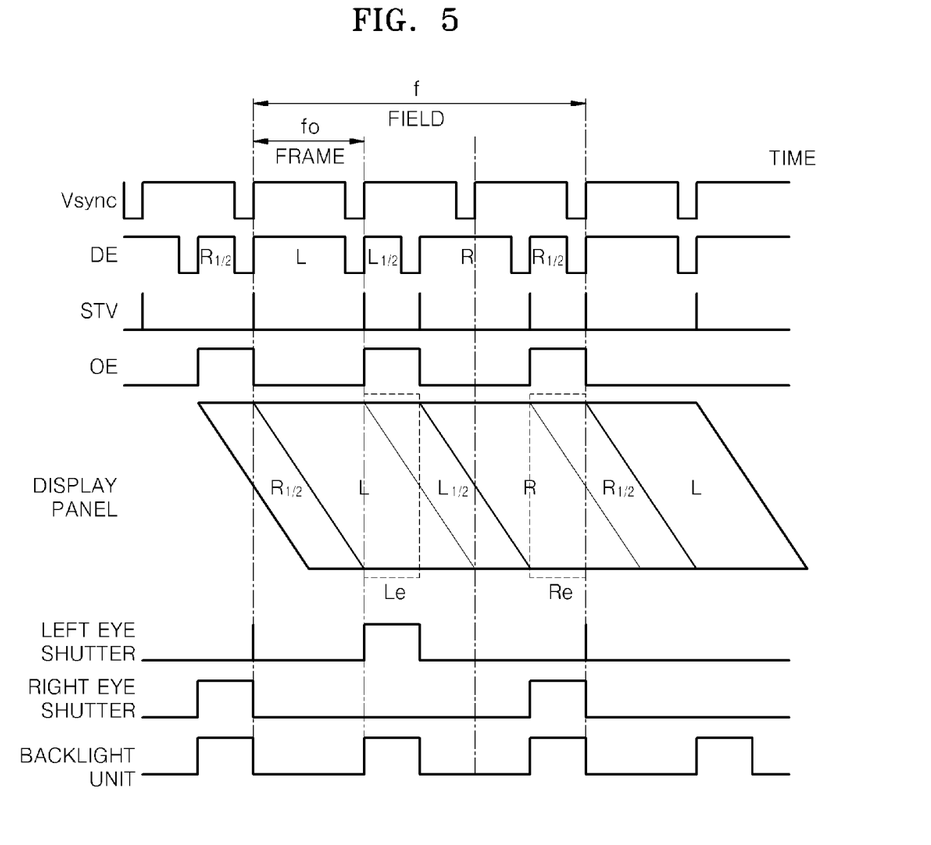
FIG. 5 illustrates a method of driving a stereoscopic display apparatus according to another embodiment.

Referring to FIG. 4, a data enable (DE) signal and an open enable (OE) signal are input to the display panel 10. The DE signal may include the left eye image signal L, the half left eye image signal $L_{1/2}$, the right eye image signal R, and the half right eye image signal $R_{1/2}$. The left eye shutter 45a may be open and the right eye shutter 45b may be closed in the first half frame period Le of the left eye image. The left eye shutter 45a may be closed and the right eye shutter 45b may be open in the second half frame period Re of the right eye image. Only the left eye image is displayed in the first half frame period Le of the left eye image, and only the right eye image is displayed in the second half frame period Re of the right eye image, thereby removing crosstalk. The backlight unit 20 may be turned on in all periods. Alternately, as illustrated in FIG. 5, the left eye shutter 45a may be open in the left eye image period Le during which the half left eye image signal $L_{1/2}$ is scanned, and the right eye shutter 45b may be open in the right eye image period Re during which the half right eye image signal $R_{1/2}$ is scanned. Also, the backlight unit 20 may be turned on in the first half frame period Le of the left eye image and in the second half frame period Re of the right eye image, and tuned off in the other periods. For example, the backlight unit 20 may be turned on once per 1.5 frames.

The OE signal that is a signal for switching each pixel of the display panel 10 may be input during the first half frame period Le of the left eye image and in the second half frame period Re of the right eye image. The OE signal may not be input in the other periods. Thus, an image may be displayed only in the first half frame period Le of the left eye image and in the latter half frame period Re of the right eye image.

Figure 6:
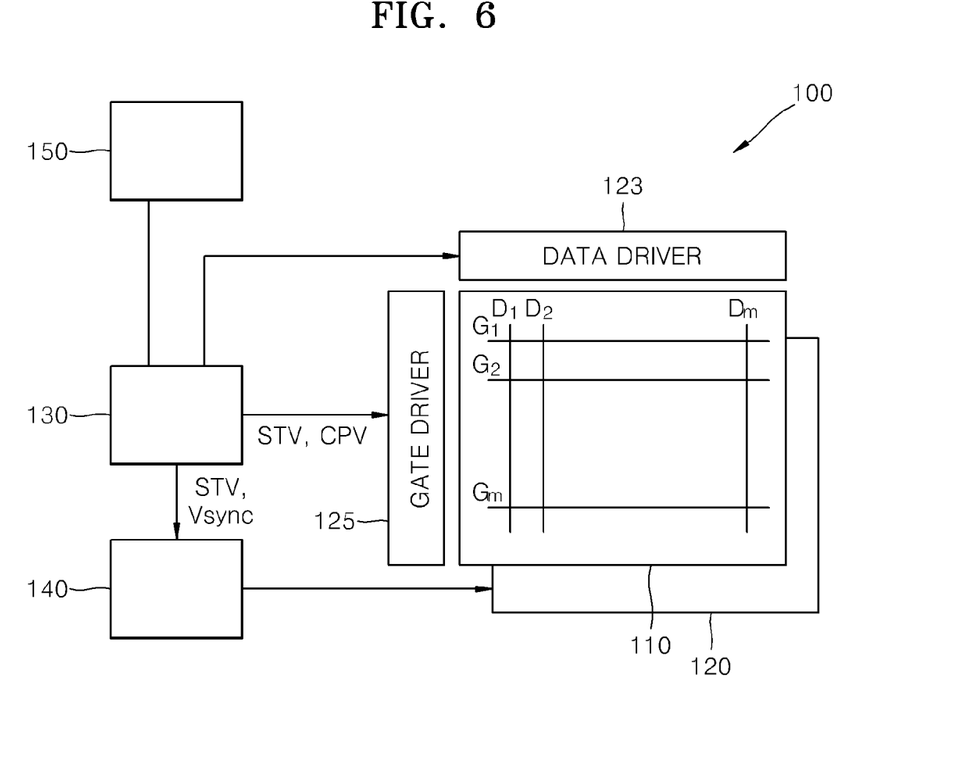
FIG. 6 illustrates a stereoscopic display apparatus according to another embodiment.

FIG. 6 illustrates a stereoscopic display apparatus 100 according to another embodiment. Referring to FIG. 6, the stereoscopic display apparatus 100 according to the present embodiment may include a display panel 110, a backlight unit 120, and an image signal input unit 130. The image signal input unit 130 may include a timing controller (not shown). The stereoscopic display apparatus 100 may include a data driver 123 for supplying a data signal (DE signal) to the display panel 110 and a gate driver 125 for supplying a scan signal STV or Vsync. Image data and timing control data may be extracted from the left eye image signal and the right eye image signal output from the image signal input unit 130. The image data may be transmitted via mini-low-voltage differential signaling (LVDS) and may include polarity control (POL) or latch clock input (TP). The gate timing control signal may include a start vertical (STV) or clock pulse vertical (CPV).

The display panel 110 may include (m×n) number of pixels arranged in a matrix format. M-number of gate lines $G_1$-$G_m$ and n-number of data lines $D_1$-$D_n$ cross each other. A thin film transistor (TFT) may be formed at a cross point where any of the scanning lines $G_1$-$G_m$ meet any of the data lines $D_1$-$D_n$. The gate driver 125 may select a line to which a data voltage is supplied by sequentially supplying a scanning selection signal to the gate line in response to the timing control data generated by the image signal input unit 130. The data driver 123 may supply the image data supplied by the image signal input unit 130 to a corresponding data line.

A backlight unit controller 140 may control the backlight unit 120 according to a signal received from the image signal input unit 130. The backlight unit controller 140 may control a blinking operation or scanning operation of the backlight unit 120. The backlight unit controller 140 may generate a backlight driving control signal using the vertical sync signal Vsync of an image signal extracted by the image signal input unit 130. Also, a shutter controller 150 may generate a shutter glasses control signal using the vertical sync signal Vsync of an image signal extracted by the image signal input unit 130. In another embodiment, the start vertical (STV) signal may be used as a reference signal for a backlight unit control signal. The backlight unit controller 140 may generate a backlight driving control signal of a toggle type in synchronization with the vertical sync signal Vsync using a logic circuit such as a latch or an inverter. The backlight unit controller 140 may turn the backlight unit 120 off during a period in which the left eye image and the right eye image are mixed with each other, and turn the backlight unit 120 on during a period in which only the left eye image or only the right eye image is displayed.

Figure 7:
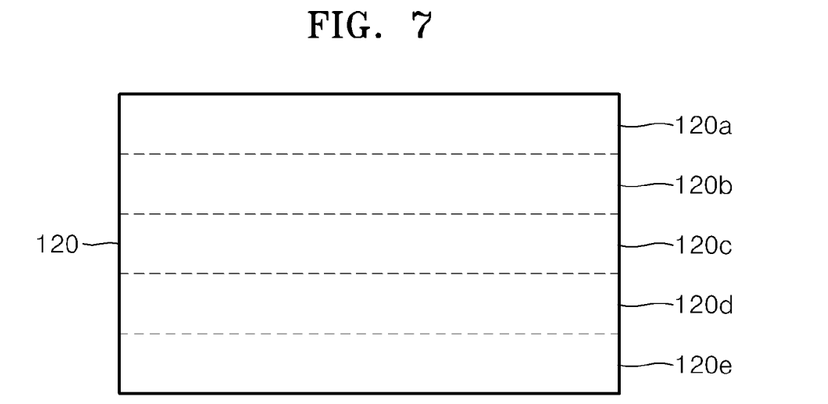
FIG. 7 illustrates an example of a backlight unit used for the stereoscopic display apparatus of FIG. 6.

In another embodiment, the backlight unit controller 140 may generate a backlight driving control signal for adjusting a turn-on period and a turn-off period of the backlight unit 120 that is divided into a plurality of blocks, in synchronization with the vertical sync signal Vsync generated by the image signal input unit 130. Referring to FIG. 7, the backlight unit 120 may be divided into first to fifth blocks 120a, 120b, 120c, 120d, and 120e, and the turn-on period of the backlight unit 120 may be adjusted separately for each block. For example, the backlight unit 120 may be turned on or off in units of blocks according to the scanning of an image.

The backlight unit 120 may emit light to the display panel 110 according to a backlight driving signal output from the backlight unit controller 140. The display panel 110 may be scanned at a frame frequency that is an odd-numbered multiple of a field frequency and display the image in a periods in which the left eye image and the right eye image are not mixed with each other, thereby reducing or removing crosstalk. There may be a variety of methods to selectively display an image during only those periods in which the left eye image and the right eye image are not mixed with each other. For example, the backlight unit 120 may be turned on only in the period in which the left eye image and the right eye image are not mixed with each other and turned off in the other periods. Thus, a stereoscopic image without crosstalk may be displayed by controlling the opening and closing of the left eye shutter 45a and the right eye shutter 45b corresponding to the periods in which the only the left image or only the right images are displayed.

Figure 8:
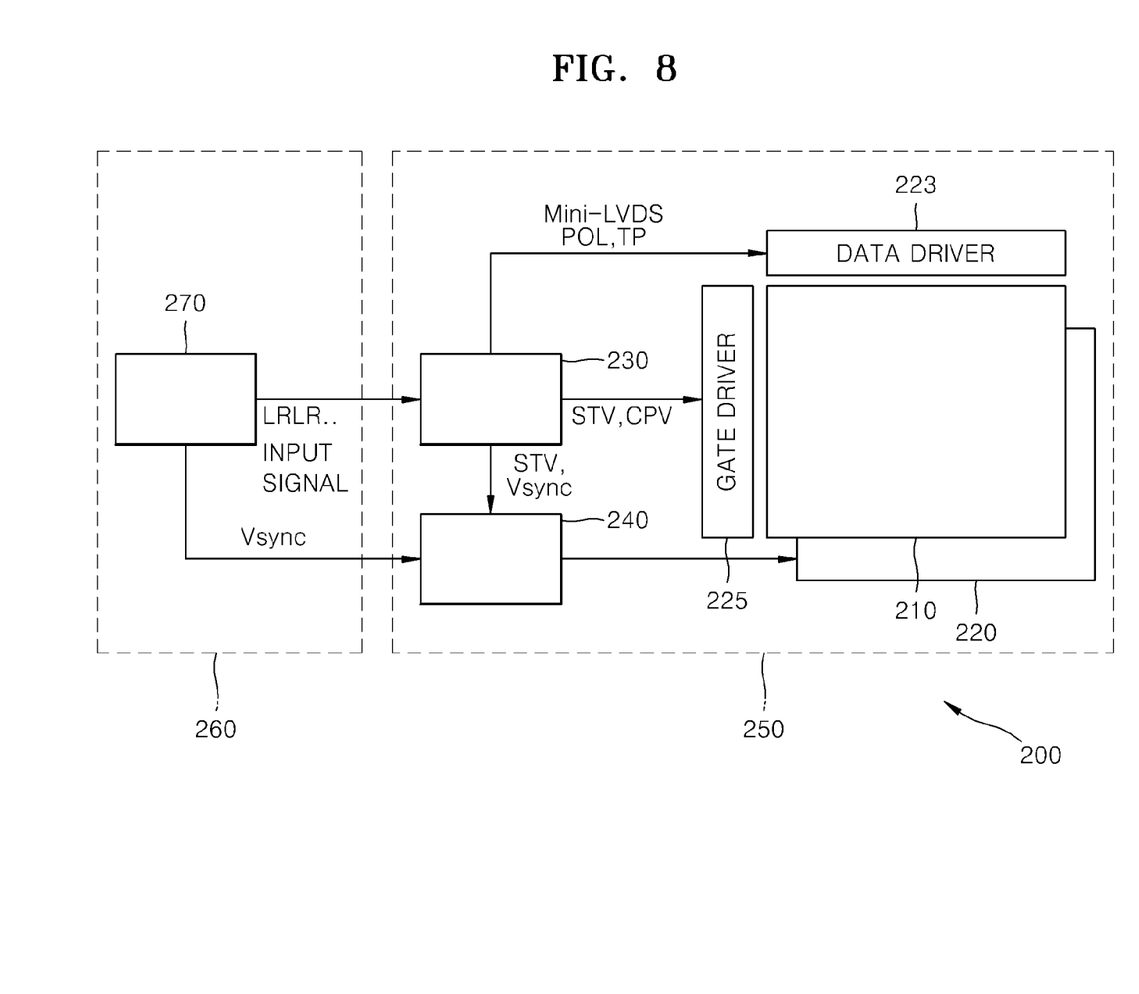
FIG. 8 illustrates a stereoscopic display apparatus according to another embodiment.

FIG. 8 illustrates a stereoscopic display apparatus 200 according to another embodiment. Referring to FIG. 8, the stereoscopic display apparatus 200 according to the present embodiment may include a display unit 250 for displaying an image and an image signal input unit 260 for inputting an image signal to the display unit 250. The display unit 250 may include the display panel 210 and the backlight unit 220. The image signal input unit 260 may include an image board 270. Since the image signal input unit 260 is provided as a separate equipment from the display unit 250, an external image signal may be input to the display unit 250. A data driver 223 for supplying a data signal to the display panel 210 and a gate driver 225 for supplying a scan signal to the display panel 210 may be provided.

The image signal input unit 260 may modulate the vertical sync signal Vsync in the image board 270 and transmit a modulated vertical sync signal to a timing controller 230. The timing controller 230 inputs a signal to the gate driver 225 of the display panel 210. The vertical sync signal Vsync is input to a backlight unit controller 240 from the image board 270 or the timing controller 230. The backlight unit controller 240 may control the backlight unit 220 in synchronization with the vertical sync signal Vsync.

The backlight unit 220 emits light to the display panel 210 according to a backlight driving signal output from the backlight unit controller 240. The display panel 210 may be scanned at a frame frequency that is an odd-numbered multiple of a field frequency and display the image in periods in which the left eye image and the right eye image are not mixed with each other, thereby reducing or removing crosstalk. The method of displaying an image in periods in which a left eye image and a right eye image are not mixed with each other is described above with reference to FIGS. 2-5.

While this detailed description has made reference to exemplary embodiments, it will be understood by those skilled in the art that various changes in form and details may be made therein without departing from the spirit and scope of the invention as defined by the appended claims.

What is claimed is:

1. A stereoscopic display apparatus comprising:
    a display panel which scans an image at a frame frequency;
    an image signal input unit which inputs an image signal to the display panel;
    a backlight unit which emits light to the display panel; and
    a shutter controller which selectively controls an opening and a closing of a left eye shutter and a right eye shutter of shutter glasses,
    wherein a field comprises a first frame including a left eye image, a third frame including a right eye image, and a second frame which is disposed between the first frame and the third frame and includes an upper half frame for a left eye image and a lower half frame for a right eye image, and,
    wherein a field frequency is a number of fields per second and the frame frequency is an odd-numbered multiple of the field frequency.

2. The stereoscopic display apparatus of claim 1, wherein, in each field, the display panel scans a first frame, a second frame, and a third frame.

3. The stereoscopic display apparatus of claim 2, wherein the backlight unit is turned on in a period in which the half left eye image is scanned and in a period in which a latter half of the right eye image signal is scanned.

4. The stereoscopic display apparatus of claim 3, wherein the backlight unit is turned on once per 1.5 frames.

5. The stereoscopic display apparatus of claim 3, wherein the backlight unit is divided into a plurality of blocks, wherein each of the plurality of blocks is individually turned on and off.

6. The stereoscopic display apparatus of claim 2, wherein the shutter controller controls to open the left eye shutter and close the right eye shutter during a period in which the half left eye image is scanned, and controls to close the left eye shutter and open the right eye shutter during a period in which a latter half of the right eye image is scanned.

7. The stereoscopic display apparatus of claim 1, wherein, in each field, the display panel scans a first frame comprising a left eye image, a first half frame in which the left eye image is held for a period of half a frame, a second frame comprising a right eye image, and a second half frame in which the right eye image is held for a period of half a frame.

8. The stereoscopic display apparatus of claim 7, wherein the backlight unit is turned on in a period in which the first half frame is scanned and a period in which the second half frame is scanned.

9. The stereoscopic display apparatus of claim 8, wherein the backlight unit is divided into a plurality of blocks and each of the plurality of blocks is individually turned on and off.

10. The stereoscopic display apparatus of claim 7, wherein the shutter controller controls to open the left eye shutter and close the right eye shutter during a period in which the first half frame is scanned, and controls to close the left eye shutter and open the right eye shutter during a period in which the second half frame is scanned.

11. The stereoscopic display apparatus of claim 1, wherein the field frequency is 50 Hz or 60 Hz.

12. The stereoscopic display apparatus of claim 1, wherein the frame frequency is 150 Hz or 180 Hz.

13. The stereoscopic display apparatus of claim 1, wherein, in each field, the display scans 1.5 frames of the left eye image and 1.5 frames of the right eye image.

14. The stereoscopic display apparatus of claim 1, wherein the image signal input unit comprises a time controller that transmits the image signal to the display panel.

15. The stereoscopic display apparatus of claim 1, wherein the image signal input unit modulates a vertical sync signal in an image board and transmits a modulated vertical sync signal to a time controller.

16. A method of driving a stereoscopic display apparatus, the method comprising:
    inputting an image signal to a display panel;

the display panel scanning the image signal at a frame frequency; and selectively opening and closing a left eye shutter and a right eye shutter of shutter glasses, wherein a field comprises a first frame including a left eye image, a third frame including a right eye image, and a second frame which is disposed between the first frame and the third frame and includes an upper half frame for a left eye image and a lower half frame for a right eye image, and wherein a field frequency is a number of fields per second, and the frame frequency is an odd-numbered multiple of the field frequency.

17. The method of claim 16, wherein scanning the image signal comprises scanning a first frame, a second frame, and a third frame.

18. The method of claim 17, further comprising turning on a backlight unit during a period in which the half left eye image is scanned and during a period in which a latter half of the right eye image is scanned.

19. The method of claim 18, wherein the turning on the backlight comprises turning on the backlight such that the backlight blinks once per 1.5 frames.

20. The method of claim 18, wherein the backlight unit comprises a plurality of blocks and turning on the backlight unit comprises individually turning each of the plurality of blocks on and off.

21. The method of claim 17, wherein selectively opening and closing comprises opening the left eye shutter and closing the right eye shutter in a period in which the half left eye image is scanned, and closing the left eye shutter and opening the right eye shutter in a period in which a latter half of the right eye image is scanned.

22. The method of claim 16, wherein scanning the image signal comprises scanning a first frame comprising a left eye image, a first half frame in which the left eye image is held for a period of half a frame, a second frame comprising a right eye image, and a second half frame in which the right eye image is held for a period of half a frame.

23. The method of claim 22, further comprising turning on a backlight unit during a period in which the first half frame is scanned and during a period in which the second half frame is scanned.

24. The method of claim 23, wherein the backlight unit comprises a plurality of blocks and turning on the backlight comprises individually turning each of the plurality of blocks on and off.

25. The method of claim 22, wherein the selectively opening and closing comprises opening the left eye shutter and closing the right eye shutter in a period in which the first half frame is scanned, and closing the left eye shutter and opening the right eye shutter in a period in which the second half frame is scanned.

26. The method of claim 16, wherein the field frequency is 50 Hz or 60 Hz.

27. The method of claim 16, wherein the frame frequency is 150 Hz or 180 Hz.

28. The method of claim 16, wherein, in each field, the display panel scans 1.5 frames of the left eye image and 1.5 frames of the right eye image.

29. A method of driving a stereoscopic display apparatus comprising:

scanning an image signal at a frame frequency, wherein each field comprises a frame comprising a left-eye image, a frame comprising a right-eye image, a half frame comprising a left-eye image, and a half frame comprising a right eye image, and controlling a backlight unit, a left-eye shutter, and a right eye shutter, such that in a period in which the left eye image and the right eye image are both displayed, both the left eye shutter and the right eye shutter are closed or the backlight unit is turned off, wherein each field comprises a first frame including a left eye image, a third frame including a right eye image, and a second frame which is disposed between the first frame and the third frame and includes an upper half frame for a left eye image and a lower half frame for a right eye image, and wherein a field frequency is a number of fields per second and the frame frequency is an odd-numbered multiple of the field frequency.

* * * * *